Oct. 27, 1964   A. SCHMIDT   3,154,191

RECIPROCATING TYPE CONVEYOR

Filed Aug. 30, 1962

INVENTOR.
ARTHUR SCHMIDT

BY

AGENT

United States Patent Office
3,154,191
Patented Oct. 27, 1964

3,154,191
RECIPROCATING TYPE CONVEYOR
Arthur Schmidt, Reichenbach (Fils), Germany, assignor to North American Philips Company, Inc., New York, N.Y., a corporation of Delaware
Filed Aug. 30, 1962, Ser. No. 220,470
Claims priority, application Germany Aug. 8, 1957
3 Claims. (Cl. 198—219)

This invention relates to devices for the continuous passage of different-sized work-pieces to be heated by induction and is a continuation-in-part of my U.S. patent application, Serial No. 752,835 filed August 4, 1958 now abandoned.

In order to obtain a satisfactory output of such devices, a tight magnetic coupling between the work-pieces to be heated and the inductor is required. Such a coupling is obtained due to the work-pieces substantially filling up the hollow space surrounded by the inductor.

If it is necessary for the device to heat work-pieces of much differing size and for this purpose the kind of work-piece introduced into the inductor is to be changed frequently, previously use has been made of heating devices, the coils of which corresponded to the largest dimensions of the work-pieces to be introduced, which dimensions did not relatively much differ spatially. In the case of work-pieces of much differing size, use was made of different heating devices. As a result thereof, the output was low and the device was not used to the best advantage.

Devices are known in which the inductors are exchangeable. However, an exchangeability is then usually concerned which, on the other hand, serves to replace or repair the coil and, on the other hand, is limited to heating devices for small and light work-pieces with simple transporting devices. If coils for work-pieces of greatly differing sizes are to be incorporated, the difficulty is involved that exchange of a coil first requires the transporting device to be dismounted. In the case of a lifting-beam transporting device, for example, not only the water and current connections, together with the attachments of the coils must be loosened, but also the supporting beams, together with the movable lifting beams, are to be removed from the coil. When another coil and transporting device are mounted then after the accurate adjustment of the coil, the transporting device also must be readjusted accurately. If use is made of elongated coils, the supporting beams are supported inside the coils. If desired, the heating of the work-pieces takes place with the exclusion of air or in an inert gas. Such constructions lead to an exchange being further impeded. The times of preparation are very long for known exchangeable devices and frequently result in unwanted impediments in production.

According to the invention, transporting devices for different kinds of work-pieces and associated different inductors are assembled to form units, of which in each case one unit is arranged in an easily dismountable and exchangeable manner on the frame of the machine comprising the drive for the transporting devices.

A device according to the invention permits of heating with satisfactory output, work-pieces of greatly differing sizes by arranging a coil provided for the relevant kind of work-piece, together with an associated transporting device, as a unit on the frame of the machine. The exchange of coils and transporting devices can thus take place in easy manner and leads to short times of preparation, which may be, for example, of the order of the times corresponding to the exchange of tools on machine presses.

In order that the invention may be readily carried into effect, one embodiment will now be described in detail, by way of example, with reference to the accompanying drawing, in which.

Figure 1:
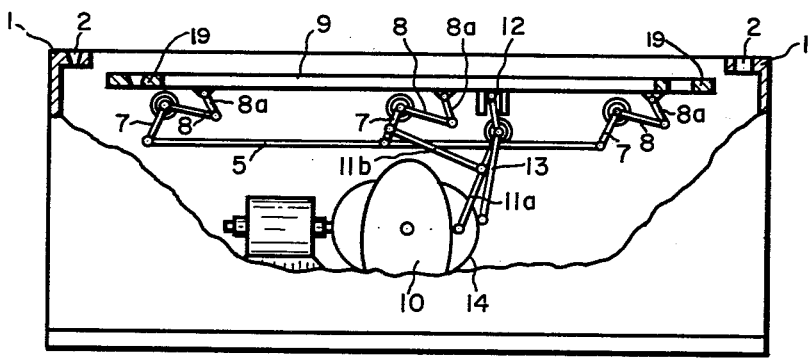
FIG. 1 shows a side-view and partly a cross-sectional view of the machine frame of a heating device according to the invention.
Figure 2:
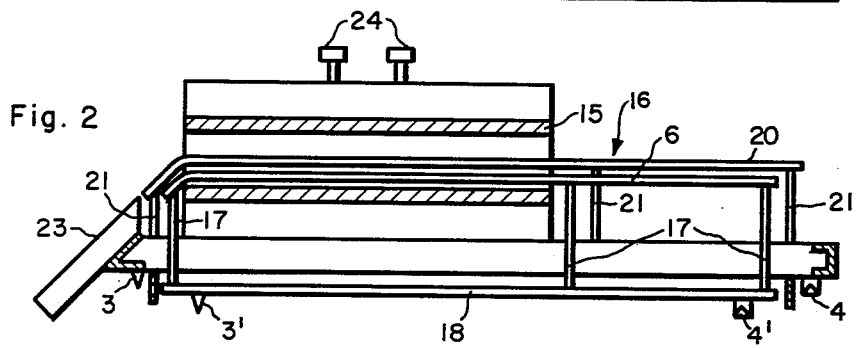
FIG. 2 shows a side-view and partly a cross-sectional view of an exchangeable unit of a heating device according to the invention, comprising a lifting-beam transporting device and a coil.
Figure 3:
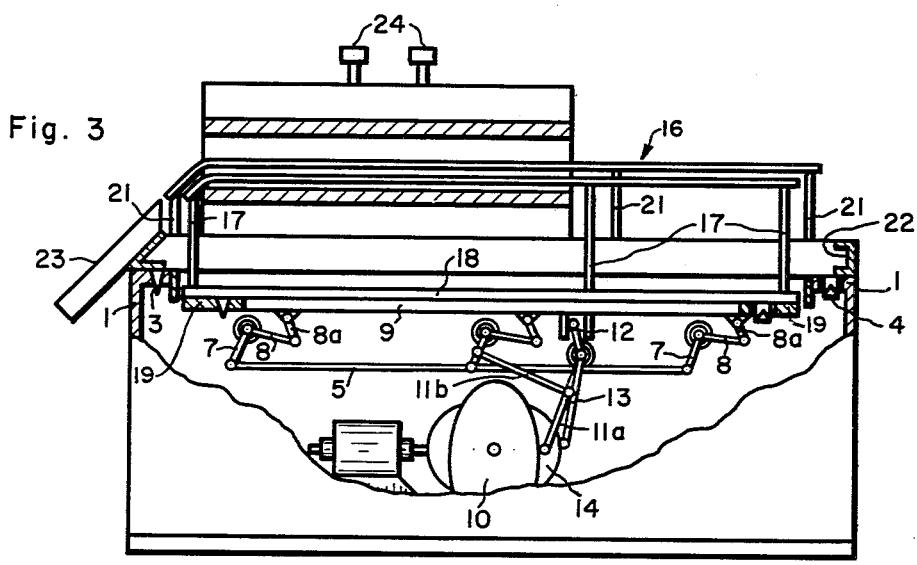
FIG. 3 shows the complete device according to the invention.

The machine frame as seen in FIG. 1 of a heating device according to the invention comprises pieces 1 for supporting the units to be deposited as seen in FIG. 2 having apertures 2 for the engagement of a centering pin 3 and a centering edge or pin 4, and also a lifting and shifting device for one or more lifting beams 6 which serve for the transport of the work-pieces. A raising device 5 connects a plurality of angle levers by means of one of the levers 7 and the second lever 8 of each angle lever is connected to a lifting frame 9 by a swinging or pivoting arm 8a. The angle levers 7, 8 are driven by an eccentric 10 through a lever transmission system 11a and 11b. Rotation of the eccentric 10 causes the angle levers 7, 8 to raise the lifting frame 9 and after one quarter of a revolution the frame 9 is lowered.

Another eccentric 14 is provided which when it rotates moves a double arm lever 12, 13. The lever arm 12 operates to horizontally shift the lifting frame 9 in the axial direction of the beams 6. During this movement the swinging arm 8a vary their positions so as to allow the horizontal shifting. Since both eccentrics 10 and 14 are rotated together raising and lowering together with shifting in the axial direction take place sequentially, the beams 6 located on the lifting frame 9, thus being set into a vertical circular movement. It should also be noted that due to the swinging action of the lever 8 the support 9 moves in the vertical direction and simultaneously a slight horizontal movement takes place. However, the horizontal movement caused by swinging lever 8 is insufficient to convey the work pieces through the inductor. Consequently, the additional horizontal movement caused by the eccentric 14 and rods 12 and 13 is necessary.

For the machine frame, several units suitable for the desired use are available (see FIG. 2) which may be mounted at will on the machine frame. Each unit substantially comprises a coil 15 and a lifting-beam transporting device 16.

The correct position of a unit on the machine frame is adjusted by centering means, that is to say a centering pin 3 and a centering edge 4, engaging in the holes 2 of the supporting pieces 1 of the machine. The beams 6, connected to ground beams 18 by means of supports 17, are located on the lifting frame 9 of the machine and are adjusted in the frame 9, as the complete machine unit, by means of a centering pin 3' and a centering edge 4'. The centering pins 3, 3' engage in the supporting pieces 1 and 19 of the machine and of the frame respectively, while the centering edges 4, 4' are arranged to be slidable in the axial direction of the centering edges in the holes 2 of the supporting pieces 1 for neutralizing the expansion in the supporting pieces 1 and 19.

The lifting-beam transporting device 16 comprises, in addition to the beams 6, the supports 17 and the ground beams 18, a plurality of supporting beams 20 which are rigidly coupled via supports 21 to the ground frame 22 of the machine unit. The supporting beams 20 serve to carry the work-pieces. However, the beams 6 perform vertically circulating movements in accordance with the lifting frame 9. When the beams 6 during their movement rise above the level of the supporting beams 20, they lift the work-pieces present on the supporting beams 20 and carry them until the beams 6 again are lower below the level of the supporting beams 20. The workpieces thus traverse the inductor and leave the machines through a discharge chute 23.

The individual units of the machine (see FIG. 2) are deposited loose on the supporting pieces 1 of the machine (see FIG. 1), for example by means of a crane, and may be locked by screws, if necessary. An adjustment other than that by the centering pin 3 and the centering edge 4 of the units is not necessary, since the coils 15 and the transporting device 16 and 20 are rigidly coupled together in each unit and cannot therefore relatively be shifted. When individual units of the machine are changed, after removal and replacing, there remains only the task to loosen and re-establish again the water and electrical current connections 24.

What I claim is:

1. A device for the transport and passage of work pieces of different sizes through an associated inductor for inductive heating comprising a transport unit including a support beam for said work pieces, a separate base frame, a lift and horizontal conveying device for lifting said work pieces from said supporting beam after a predetermined vertical position of said device has been reached and moving said work pieces through said inductor, said lift and horizontal conveying device comprising a pair of eccentrics, a plurality of angle levers and pivoting arms operatively connected to one eccentric and a double arm lever operatively connected to the other eccentric, means for motivating said eccentrics and, a plurality of centering pins affixed to said transport unit, and means in said base frame for receiving said centering pins to thereby selectively place a transport unit on said base frame.

2. A device for the transport and passage of work pieces of different sizes through an associated inductor for inductive heating comprising a transport unit including a support beam for said work pieces, a separate base frame, a lift and horizontal conveying device for lifting said work pieces from said supporting beam after a predetermined vertical position of said device has been reached and moving said work pieces through said inductor, said lift and horizontal conveying device comprising a pair of eccentrics, a plurality of angle levers and pivoting arms operatively connected to one eccentric and a double arm lever operatively connected to the other eccentric, a drive unit for rotating said eccentrics, a plurality of centering pins affixed to said transport unit, and means in said base frame for receiving said centering pins to thereby selectively place a transport unit on said base frame.

3. A device for the transport and passage of work pieces of different sizes through an associated inductor for inductive heating comprising a transport unit including a support beam for said work pieces, a separate base frame, a lift and horizontal conveying device for lifting said work pieces from said supporting beam after a predetermined vertical position of said device has been reached and moving said work pieces through said inductor, drive unit including two different-shaped eccentrics, a horizontally arranged raising device, a plurality of angle levers connected thereto at spaced locations thereon, a pivoting arm pivotally connected to an adjacent angle lever at one end thereof and pivotally connected to the supporting beam at the other end thereof, means operatively connecting one of said eccentrics to said raising device for moving said lift and horizontal conveying device, a plurality of centering pins affixed to said transport unit, and means in said base frame for receiving said centering pins to thereby selectively place a transport unit on said base frame.

References Cited in the file of this patent

UNITED STATES PATENTS

| | | |
|---|---|---|
| 1,686,696 | Hirschmann | Oct. 9, 1928 |
| 2,451,623 | Leslie | Oct. 19, 1948 |
| 2,580,114 | Marvin | Dec. 25, 1951 |

FOREIGN PATENTS

| | | |
|---|---|---|
| 771,395 | Great Britain | Apr. 3, 1957 |